Figure 1A:
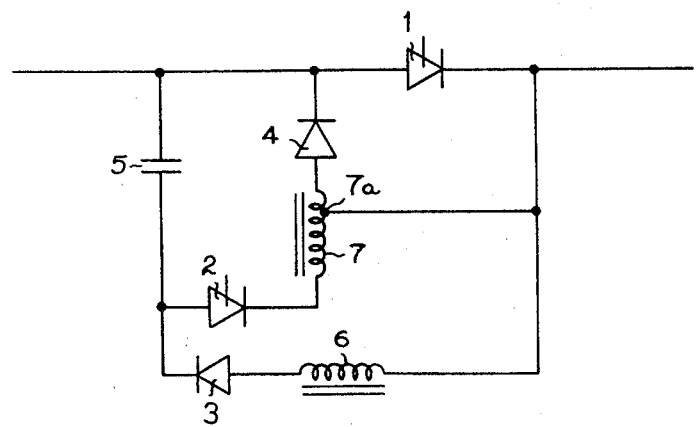

United States Patent

[11] 3,588,542

| [72] | Inventor | Peter Knapp<br>Muhleweg, Switzerland |
|---|---|---|
| [21] | Appl. No. | 825,540 |
| [22] | Filed | May 19, 1969 |
| [45] | Patented | June 28, 1971 |
| [73] | Assignee | Aktiengesellschaft Brown, Boveri & Cie<br>Baden, Switzerland |
| [32] | Priority | May 21, 1968 |
| [33] | | Switzerland |
| [31] | | 7554/68 |

[54] CIRCUIT ARRANGEMENT FOR IMPROVING COMMUTATION OF THYRISTORS
3 Claims, 2 Drawing Figs.

[52] U.S. Cl. .................................................. 307/252,
307/282, 307/305
[51] Int. Cl. .................................................. H03k 17/00
[50] Field of Search .................................... 307/252.51
.55, 305

[56] References Cited
UNITED STATES PATENTS

| 3,242,352 | 3/1966 | Long | 307/252 |
|---|---|---|---|
| 3,431,436 | 3/1969 | King | 307/252 |

*Primary Examiner*—Donald D. Forrer
*Assistant Examiner*—David M. Carter
*Attorney*—Pierce, Scheffler & Parker

ABSTRACT: In a circuit arrangement for improving the forced commutation of thyristor-direct current setters wherein quenching of the thyristor is effected by commutating the load current to a condenser, the voltage appearing on the condenser is divided by means of an autotransformer, and only a partial voltage as determined by the diving ratio of the transformer is supplied to the thyristor for quenching. Because of the voltage division, there is no temporary increase in the load voltage during commutation.

PATENTED JUN 28 1971          3,588,542

INVENTOR.
Peter Knapp
BY
Pierce, Scheffler & Parker
Attorneys

CIRCUIT ARRANGEMENT FOR IMPROVING COMMUTATION OF THYRISTORS

This invention relates to a circuit arrangement for improving the forced commutation of thyristor-direct current setters wherein extinction of the thyristor is effected by commutating the load current to a condenser.

Direct current setters with such extinction or quenching condensers, which are in general use today, are discussed in detail, for example, in an article by K. Däther and W. Faust entitled "Electronic Direct Current Setter For A Trolley Bus" published in "Brown Boveri Mitteilungen, Vol. 53 No. 10 (1966)".

In the case of the quenching condenser arrangement described in this article, a voltage is formed on the condenser, arranged in series with a changeover choke, during the preparation period for quenching, which is equal to the feed voltage. During the commutation, the sum of the feed and condenser voltages is thus applied to the load. The result of this is that the load voltage jumps briefly to double the value. Only in circuits in which several setters cooperate (suction choke, divider filter condenser and series connection of the setters) is this effect slightly reduced.

The above-mentioned voltage peaks can result in a considerable stress for the load which can, in the case of motor application, for example, result in damage to the motor winding insulation and commutation.

The present invention is directed to a solution of this problem which exists in thyristor setter circuits of the previously known types. The problem is solved in accordance with the invention by dividing the voltage appearing on the quenching condenser during commutation by means of an autotransformer, and in that only a partial voltage, as determined by the divider ratio of the transformer, is fed to the thyristor for quenching.

In circuit arrangements according to the invention, wherein there is used a recharging circuit arranged parallel to the thyristor-direct current setter, which consists of the series connection of the quenching condenser and an antiparallel diode, as compared to the conducting direction of the setter thyristor, and a changeover choke, while the quenching circuit parallel to the setter-thyristor comprises the quenching condenser and an auxiliary thyristor of the same conducting direction as the setter thyristor, the quenching circuit in series with the auxiliary thyristor contains in addition, the part of the autotransformer arranged between one coil end of the autotransformer and its tap. In addition, a bridging circuit is formed for the condenser by the diode connecting the other coil end of the autotransformer with a plate of the quenching condenser, remote from the second thyristor, and the diode in the bridging circuit has the same conducting direction as that of the second thyristor.

Figure 1B:
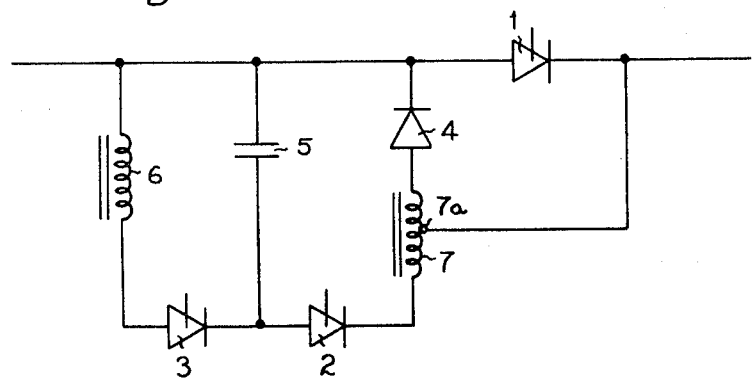

The invention will be described more fully hereinafter on the basis of two illustrative embodiments and which are illustrated respectively in the accompanying drawings. In these drawings:

FIG. 1a is circuit diagram illustrating one embodiment of the invention in association with a known, basic type circuit for a thyristor-direct current setter, and FIG. 1b shows a modified circuit which includes additional components that are brought into operation before the setter thyristor ignites.

With reference now to the drawings, the circuit illustrated in FIG. 1a differs from a known basic circuit for a direct current setter only by the addition of two components, these being a diode 4 and an autotransformer 7 which permit the desired voltage transformation, and division, respectively. If one starts from a condition of a voltage-free state of the load, which one has to imagine as being in series behind the direct current setter thyristor 1, the following switching phases are passed through.

First, the (positive) feed voltage is on the (blocked) setter thyristor 1, the cathode of diode 4, and on the upper plate of the quenching condenser 5. After ignition of the thyristor, the feed voltage is connected through to the load, and recharging of the quenching condenser is effected over a changeover circuit parallel to this thyristor, this latter circuit consisting of a changeover choke 6, diode 3 and quenching condenser 5 arranged in series, and after completion of which the current is reversed, diode 3 becomes blocked and the quenching condenser now has a voltage polarity which is opposite from what it was in the initial state. On the lower plate of the now ready-to-quench condenser is thus a positive voltage difference, compared to the upper plate, which is equal to the feed voltage; this means that the voltage at the junction point of elements 5 and 3, measured against the negative pole of the feed voltage, is in this stage equal to double the feed voltage.

The quenching process is started by ignition of an auxiliary thyristor 2 which is connected to one winding end of the autotransformer 7. A new changeover circuit is formed, which comprises the quenching condenser 5 which is part of the circuit paralleling the thyristor-direct current setter 1, the ignited auxiliary thyristor 2, the winding of autotransformer 7 and diode 4. The part of the quenching condenser voltage tapped at the tap point 7a on the winding of transformer 7 arrives as positive voltage on the cathode of the setter-thyristor 1 and quenches the latter. If the transformer 7 and diode 4 were not provided (this would then correspond to the previously known circuit arrangement) the full quenching voltage (sum of feed and condenser voltages) would be applied temporarily to the load which would then lead to the aforementioned disadvantageous phenomena. Due to the fact that, in accordance with the invention, only a part of the condenser voltage is used for quenching, and that this voltage can be adjusted at will, these annoying voltage peaks can be reduced to a great extent, while quenching of the setter thyristor is ensured.

After the quenching of the setter thyristor, the quenching condenser 5 is again recharged by the circuit through components 5—2—7—4 and the load current. During this changeover process, the auxiliary thyristor 2 quenches and, after recharging, the initial state is reached, so that all components are again currentless.

In the modified circuit according to FIG. 1b, the function of the setter thyristor 1 (as compared with the circuit of FIG. 1a) is taken over by an additional auxiliary thyristor 3'. Here the following phases are passed through, starting from a voltage-free initial state.

First, the feed voltage is applied to the components 1, 5, 3' and 4. The recharging of the quenching condenser 5 is started by ignition of the auxiliary thyristor 3' and is effected over the recharging circuit 5—6—3'. After recharging has terminated (current reverse) the auxiliary thyristor 3' becomes blocked and the circuit is read to quench. Again, the feed voltage is applied to the load by ignition of the setter thyristor 1, and the quenching process is started by ignition of auxiliary thyristor 2, which can be effected in any short time interval behind ignition of thyristor 1. Just as in the embodiment of FIG. 1a, the new changeover circuit 5—2—7—4 is formed for the quenching condenser 5, a part of the quenching condenser voltage as determined by the tap at tap point 7a on the winding of transformer 7, arrives as positive on the cathode of the setter thyristor 1, and effects its quenching. The quenching condenser 5 is again recharged by the changeover circuit 5—2—7—4 as well as the load current, after which the initial state is reached whereupon all components will be currentless.

Due to the fact that the quenching readiness in the circuit according to the embodiment of FIG. 1b can be produced even before ignition of the setter thyristor 1, it is possible to reduce the pulse time to the duration of the quenching impulse.

The improved circuit arrangement afforded by the invention enables reduction of voltage peaks with a particularly low expenditure since an inductivity is anyhow necessary for recharging of the quenching condenser as a function of time, and can easily be designed as an autotransformer by arranging for a suitable tap on the winding.

If an after connected thyristor setter is provided for the purpose of range extension, its blocking capacity can be reduced.

I claim:

1. A thyristor-direct current setter circuit arrangement comprising a main thyristor-direct current setter arranged to be supplied with a feed voltage for supplying a load with direct current, a quenching circuit connected in parallel with said main thyristor, said quenching circuit including a quenching condenser, a second thyristor and an autotransformer arranged in series, said second thyristor having the same conducting direction as said main thyristor and being connected to one end of the winding of said autotransformer, and a tap point on said winding being connected to the output side of said main thyristor, and a diode oppositely poled with respect to said main thyristor and which is connected between the other end of said autotransformer winding and the input side of said main thyristor, and circuit means for recharging said quenching condenser.

2. A thyristor-direct current setter circuit as defined in claim 1 wherein said circuit means for recharging said quenching condenser comprises a series arrangement of a second diode and choke coil connected between the output side of said main thyristor and said condenser, said second diode being oppositely poled in relation to said main thyristor.

3. A thyristor-direct current setter circuit as defined in claim 1 wherein said circuit means for recharging said quenching condenser comprises a series arrangement of a third thyristor and a choke coil connected in parallel with said quenching condenser, said third thyristor having the same conducting direction as said main thyristor.